(12) United States Patent
Takemura et al.

(10) Patent No.: US 7,974,073 B2
(45) Date of Patent: Jul. 5, 2011

(54) ELECTRIC DOUBLE-LAYER CAPACITOR WITH A NEGATIVE ELECTRODE CONTAINING A CARBON MATERIAL AND A TITANIUM OXIDE

(75) Inventors: Daigo Takemura, Tokyo (JP); Kenro Mitsuda, Tokyo (JP); Tetsuo Mitani, Tokyo (JP); Kazuki Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/869,156

(22) Filed: Oct. 9, 2007

(65) Prior Publication Data

US 2008/0112112 A1 May 15, 2008

(30) Foreign Application Priority Data

Nov. 13, 2006 (JP) ................................. 2006-306512
May 14, 2007 (JP) ................................. 2007-127888

(51) Int. Cl.
*H01G 9/00* (2006.01)
(52) U.S. Cl. ....................................................... 361/502
(58) Field of Classification Search .................... 361/502
See application file for complete search history.

(56) References Cited

U.S. PATENT DOCUMENTS

| | | | | | |
|---|---|---|---|---|---|
| 4,422,917 | A | * | 12/1983 | Hayfield | 204/196.01 |
| 6,094,338 | A | * | 7/2000 | Hirahara et al. | 361/502 |
| 6,500,575 | B1 | * | 12/2002 | Shiue et al. | 429/27 |
| 6,525,923 | B2 | * | 2/2003 | Ishikawa et al. | 361/508 |
| 7,091,156 | B2 | * | 8/2006 | Hirahara et al. | 502/416 |
| 7,167,353 | B2 | * | 1/2007 | Yuyama et al. | 361/502 |
| 7,582,386 | B2 | * | 9/2009 | Takami et al. | 429/231.1 |
| 7,585,488 | B2 | * | 9/2009 | Sakai | 423/613 |
| 7,623,340 | B1 | * | 11/2009 | Song et al. | 361/502 |
| 2001/0012193 | A1 | * | 8/2001 | Watanabe et al. | 361/502 |
| 2002/0172865 | A1 | * | 11/2002 | Che et al. | 429/231.1 |
| 2003/0036001 | A1 | * | 2/2003 | James et al. | 429/232 |
| 2005/0058907 | A1 | * | 3/2005 | Kurihara et al. | 429/232 |
| 2006/0263687 | A1 | * | 11/2006 | Leitner et al. | 429/217 |
| 2007/0081938 | A1 | * | 4/2007 | Sakai | 423/610 |
| 2007/0158185 | A1 | * | 7/2007 | Andelman et al. | 204/229.7 |
| 2007/0281854 | A1 | * | 12/2007 | Harbour et al. | 502/156 |

FOREIGN PATENT DOCUMENTS

| | | | |
|---|---|---|---|
| JP | 63206314 A * | 8/1988 | |
| JP | 9-63905 | 3/1997 | |
| JP | 2001-217162 | 8/2001 | |
| JP | 2001217162 A * | 8/2001 | |

(Continued)

OTHER PUBLICATIONS

Frackowiak et al., Carbon materials for the electrochemical storage of energy in capacitors, May 2001, Elsevier, Carbon vol. 9 Issue 6, pp. 937-950.*

*Primary Examiner* — Eric Thomas
*Assistant Examiner* — David M Sinclair
(74) *Attorney, Agent, or Firm* — Oblon, Spivak, McClelland, Maier & Neustadt, L.L.P.

(57) ABSTRACT

An electric double-layer capacitor includes: a positive electrode containing a carbon material; a negative electrode containing a carbon material and a titanium oxide; and an electrolytic solution containing an ammonium salt. A weight ratio of the titanium oxide to the carbon material contained in the negative electrode is 2% by weight or more but not more than 50% by weight.

8 Claims, 3 Drawing Sheets

FOREIGN PATENT DOCUMENTS

| | | |
|---|---|---|
| JP | 2002-158140 | 5/2002 |
| JP | 2002-270175 | 9/2002 |
| JP | 2002289481 A * | 10/2002 |
| JP | 2003-132945 | 5/2003 |
| JP | 2004-55541 | 2/2004 |
| JP | 2005-353652 | 12/2005 |
| JP | 2006278234 A * | 10/2006 |
| WO | WO 2005044448 A1 * | 5/2005 |

* cited by examiner

FIG. 1

| | TITANIUM OXIDE ADDED TO NEGATIVE ELECTRODE | WT. RATIO OF TITANIUM OXIDE TO ACTIVE CARBON OF NEGATIVE ELECTRODE (wt.%) | ELECTROLYTIC SALT | SPECIFIC SURFACE AREA OF TITANIUM OXIDE ADDED (m²/g) | INITIAL ELECTROSTATIC CAPACITY (F/g) | ELECTROSTATIC CAPACITY AFTER 500 h (F/g) | RETENTION RATE OF ELECTROSTATIC CAPACITY AFTER 50000 CYCLES (%) | INITIAL INTERNAL RESISTANCE (Ω) | INTERNAL RESISTANCE AFTER 500 h (Ω) |
|---|---|---|---|---|---|---|---|---|---|
| Ex. 1 | $Li_4Ti_5O_{12}$ | 25 | $TEABF_4$ | 10 | 23.0 | 18.6 | 91 | 0.9 | 1.9 |
| Ex. 2 | $Li_4Ti_5O_{12}$ | 50 | Do. | 10 | 20.0 | 15.8 | 90 | 1.1 | 2.6 |
| Ex. 3 | $Li_4Ti_5O_{12}$ | 10 | Do. | 10 | 24.0 | 18.7 | 91 | 0.95 | 2.0 |
| Ex. 4 | $TiO_2$ | 50 | Do. | 50 | 20.0 | 16.4 | 90 | 1.15 | 2.4 |
| Ex. 5 | $TiO_2$ | 35 | Do. | 50 | 22.0 | 18.5 | 92 | 0.95 | 1.5 |
| Ex. 6 | $TiO_2$ | 25 | Do. | 50 | 23.0 | 19.6 | 92 | 0.9 | 1.4 |
| Ex. 7 | $TiO_2$ | 15 | Do. | 50 | 23.5 | 20.0 | 92 | 0.9 | 1.4 |
| Ex. 8 | $TiO_2$ | 10 | Do. | 50 | 24.0 | 20.2 | 92 | 0.95 | 1.6 |
| Ex. 9 | $TiO_2$ | 5 | Do. | 50 | 24.2 | 19.1 | 90 | 1.0 | 1.9 |
| Ex. 10 | $TiO_2$ | 2 | Do. | 50 | 24.4 | 17.1 | 90 | 1.15 | 2.5 |
| Ex. 11 | $TiO_2$ (ALSO ADDED TO POSITIVE ELECTRODE) | 25 (POSITIVE ELECTRODE: 25) | Do. | 50 | 21.0 | 16.3 | 90 | 1.0 | 2.2 |
| Ex. 12 | $Li_4Ti_5O_{12}$ | 25 | Do. | 2 | 23.0 | 15.2 | 87 | 1.2 | 3.0 |
| C. Ex. 1 | NO TiOXIDE | 0 | $TEABF_4$ | — | 25.0 | 14.5 | 83 | 1.2 | 3.0 |
| C. Ex. 2 | $Li_4Ti_5O_{12}$ ALONE | — | $LiBF_4$ | 10 | 30.0 | 6.0 | 15 | 2.5 | 30 |
| C. Ex. 3 | $Li_4Ti_5O_{12}$ | 25 | Do. | 10 | 20.0 | 10.0 | 72 | 1.5 | 15 |
| C. Ex. 4 | $TiO_2$ | 25 | Do. | 50 | 21.0 | 11.6 | 75 | 1.2 | 11 |
| C. Ex. 5 | NO ($Li_4Ti_5O_{12}$ ADDED TO POSITIVE ELECTRODE) | 0 (POSITIVE ELECTRODE: 25) | $TEABF_4$ | 10 | 19.0 | 9.1 | 78 | 1.3 | 6.0 |
| C. Ex. 6 | NO ($TiO_2$ ADDED TO POSITIVE ELECTRODE) | 0 (POSITIVE ELECTRODE: 25) | Do. | 50 | 22.0 | 12.3 | 82 | 1.3 | 5.0 |
| C. Ex. 7 | $TiO_2$ | 1.0 | Do. | 50 | 24.5 | 14.7 | 83 | 1.2 | 2.9 |
| C. Ex. 8 | $TiO_2$ | 0.5 | Do. | 50 | 24.8 | 14.4 | 83 | 1.2 | 3.0 |
| C. Ex. 9 | $TiO_2$ | 60 | Do. | 50 | 18.5 | 13.1 | 84 | 1.4 | 3.3 |
| C. Ex. 10 | $TiO_2$ | 100 | Do. | 50 | 12.0 | 6.8 | 83 | 3.0 | 9.0 |

$TEABF_4$: TETRAETHYLAMMONIUM TETRAFLUOROBORATE.
$LiBF_4$: LITHIUM TETRAFLUOROBORATE.

ELECTRIC DOUBLE-LAYER CAPACITOR WITH A NEGATIVE ELECTRODE CONTAINING A CARBON MATERIAL AND A TITANIUM OXIDE

CROSS-REFERENCE TO RELATED APPLICATIONS

This application is based upon and claims the benefit of priority from Japanese Patent Application No. 2006-306512, filed on Nov. 13, 2006, and Japanese Patent Application No. 2007-127888, filed on May 14, 2007, the entire contents of which are incorporated herein by reference.

BACKGROUND OF THE INVENTION

1. Field of the Invention

This invention relates to an electric double-layer capacitor.

2. Description of the Related Art

An electric double-layer capacitor is a charge storage device which includes: a positive electrode in which a polarizable electrode is closely attached to a positive electrode current collector plate; a negative electrode in which a polarizable electrode is closely attached to a negative electrode current collector plate; a separator; and an electrolytic solution. These positive and negative electrodes face to each other across the separator and the electrostatic capacitance of an electric double layer formed on the polarizable electrodes in the electrolytic solution is utilized. As the major constituent of the polarizable electrodes in electric double-layer capacitors, carbon-based materials having an extremely large surface area per unit mass, such as active carbon, are often used. The electric double-layer capacitor has much larger electrostatic capacitance, as compared with capacitors of, for example, aluminum electrolytic capacitors. Different from charge storage devices with the use of electrochemical reactions such as secondary batteries, charge and discharge of an electric double-layer capacitor are conducted by transferring ions into and from micropores of active carbon. Therefore, the electric double-layer capacitor can be very quickly charged and discharged without resorting to electrochemical reactions. By taking the advantage of these characteristics, it has been considered to employ electric double-layer capacitors for various purposes, for example, a power supply for memory backup system in electronic devices, a charge storage device for home appliances and copy machines, a starting power supply for automotives in idling stop, a power supply for hybrid cars, a power storage system for peak-shaving or leveling in solar photovoltaic generation, and so on. Thus, electric double-layer capacitors are expected as a key device contributing to energy saving and reduction in carbon emission.

In an electric double-layer capacitor, it is an important problem to increase the storage energy which is one of the major performances thereof. Since the storage energy in an electric double-layer capacitor increases in proportion to the square of the charging voltage, elevation in the charging voltage results in an increase in the storage energy. To elevate the charging voltage of an electric double-layer capacitor, it is required to elevate the withstand voltage. Although the withstand voltage of an electric double-layer capacitor varies depending on the electrolytic solution employed, it ranges from about 2.3 to about 2.7 V in a non-aqueous system. To elevate the voltage, there have been proposed a hybrid type electric double-layer capacitor which includes, for example, a combination of a negative electrode having a polarizable electrode containing a carbon material or a metal oxide capable of storing and releasing lithium ion, a positive electrode having a polarizable electrode made of active carbon and an electrolytic solution containing lithium ion (see, for example, Patent Documents 1 to 4). In the case of using lithium titanate in the polarizable electrode of the negative electrode of such a hybrid type electric double-layer capacitor, it is reported the cycle characteristics can be improved since lithium titanate has a redox potential to lithium ion at around 1.5 V and shows little change in volumetric expansion upon the storage and release of lithium ion. As a method of improving the electrical resistance of an electrode, there has been also proposed an electrode in which a small amount (i.e., 1.25% by weight or less based on the active carbon) of a metal oxide and a binder are added to the active carbon so as to protect the active carbon surface from coating with the binder (see, for example, Patent Document 5).

Patent Document 1: JP-A-2002-270175 (page 2)
Patent Document 2: JP-A-2003-132945 (page 2)
Patent Document 3: JP-A-2004-55541 (pages 3 to 4)
Patent Document 4: JP-A-2005-353652 (page 3)
Patent Document 5: JP-A-2001-217162 (pages 2 to 3)

However, such an electric double-layer capacitor with the combined use of an electrolytic solution containing lithium ion with a negative electrode using a carbon material or a metal oxide capable of storing and releasing lithium ion suffers from a problem of having poor cycle characteristics and a low storage stability at high temperature, since an electrochemical reaction arises at the discharge. In an electric double-layer capacitor having a negative electrode made of a material containing lithium titanate, for example, an electrochemical reaction represented by the following formula (1) is employed and, therefore, irreversible degradation of lithium titanate accompanying the discharge is unavoidable, which brings about a problem that the in charge/discharge cycle stability is lowered.

$$Li_4Ti_5O_{12} + xLi = Li_{4+x}Ti_5O_{12} \tag{1}$$

A hybrid type electric double-layer capacitor having a negative electrode made of a material containing lithium titanate has working voltage of about 2.5V due to a redox potential of lithium titanate, which brings about another problem that the voltage cannot be elevated any more.

When the hybrid type electric double-layer capacitor is held under high-voltage application, there arises a problem that the active carbon surface is coated with decomposition products, which are formed by the decomposition of the electrolytic solution or impurities, or a gas generated by the decomposition is adsorbed by the active carbon surface so that the electrostatic capacitance of the electric double-layer capacitor is lowered and the charge/discharge cycle characteristics are deteriorated.

By using an electrode in which a small amount (i.e., 1.25% by weight or less based on the active carbon) of a metal oxide and a binder are added to the active carbon, it can be expected that the electrostatic capacitance is elevated and the electrical resistance is lowered. In this case, however, there still remains a problem that the charge/discharge cycle characteristics and the storage stability at high temperature cannot be improved. Since an electric double-layer capacitor has a life period of several years, it has been a practice to estimate the life period by accelerating the degradation conducting a float test, wherein a cell is stored under applying voltage at high temperature, as an accelerated life test. It is generally said that the life period is reduced by half with an increase in temperature by 7° C. The term "high voltage" as used herein means voltage of 3.0 V or higher, i.e., exceeding the charge voltage (2.5 V to 2.7 V) of electric double-layer capacitors commonly employed.

SUMMARY OF THE INVENTION

According to an aspect of the invention, there is provided an electric double-layer capacitor including: a positive electrode containing a carbon material; a negative electrode containing a carbon material and a titanium oxide; and an electrolytic solution containing an ammonium salt; wherein a weight ratio of the titanium oxide to the carbon material contained in the negative electrode is 2% by weight or more but not more than 50% by weight.

BRIEF DESCRIPTION OF THE DRAWINGS

FIG. 1 shows a comparison of the characteristics of Examples and Comparative Examples;

DETAILED DESCRIPTION OF THE PREFERRED EMBODIMENTS

Figure 2:
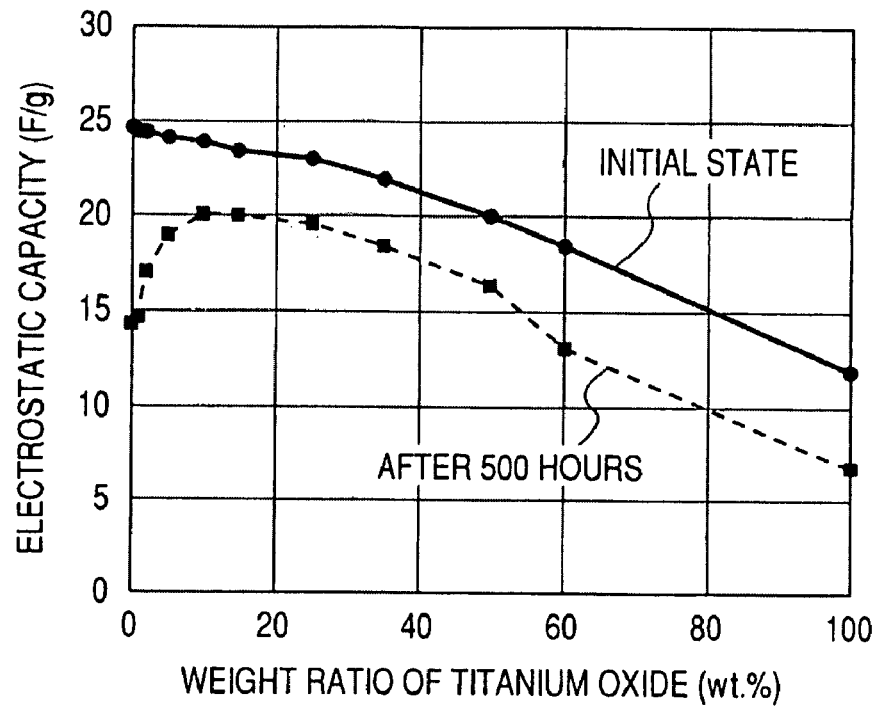
FIG. 2 shows the characteristics of Examples and Comparative Examples.

To overcome the problems encountering in the currently available electric double-layer capacitors, an electric double-layer capacitor was constructed by way of trial by using a polarizable electrode made of a carbon material containing 2 to 50% by weight of a titanium oxide (for example, lithium titanate or titanium dioxide) having a large specific surface area as the negative electrode and adding an ammonium salt to the electrolytic solution. As a result, it has been found out that the thus obtained electric double-layer capacitor is superior in charge/discharge cycle characteristics and storage stability at high temperature to the currently available electric double-layer capacitors and ensures the achievement of higher voltage. It has been also found out that the electric double-layer capacitor as described above is superior in cycle characteristics to the existing hybrid type electric double-layer capacitor having an electrode containing a lithium salt and a polarizable electrode using lithium titanate in the negative electrode. It is considered that, since energy storage in the above-described electric double-layer capacitor does not depend on an electrochemical reaction between the titanium oxide (for example, lithium titanate) contained in the negative electrode and the ammonium salt, there arises no irreversible deterioration of the titanium oxide, thereby achieving excellent charge/discharge characteristics and a high cycle stability. In the electric double-layer capacitor, moreover, the titanium oxide (for example, lithium titanate or titanium dioxide) contained in a larger amount (i.e., 2 to 50% by weight) than in the currently available ones based on the carbon material of the negative electrode seemingly exerts an effect of inhibiting the reaction between the carbon material and the electrolytic solution, thereby ensuring the improvement in storage stability at high temperature and achievement of higher voltage.

When the titanium oxide is added in an amount of more than 2% by weight based on the carbon material, the resistance of the electrode is little elevated.

Next, an embodiment of the electric double-layer capacitor according to the invention will be described.

In this embodiment, "a negative electrode" represents an assembly including: a polarizable electrode of the negative electrode in which a carbon material of the negative electrode and a conductive additive are bonded together with a binder; and a current collector. Also, "a positive electrode" in this embodiment represents an assembly including: a polarizable electrode of the positive electrode in which a carbon material of the positive electrode and a conductive additive are bonded together with a binder; and a current collector. These negative and positive electrodes are packed within a packaging. To prevent short circuit, an insulating separator is provided between these negative and positive electrodes. The packaging is filled with an electrolytic solution and air-tightly sealed. Lead wires are connected respectively to the negative and positive electrodes and extended outside the packaging via a sealant.

As the carbon material contained in the negative and positive electrodes in this embodiment, nanogate carbon, nanostorage carbon and the like may be used. The specific surface area thereof is preferably from 500 to 3000 $m^2/g$ and the average particle size thereof is preferably from 0.5 to 20 μm. As the carbon material, it is preferable to use such a starting carbon-based material after carbonizing and activating. Examples of the starting carbon-based material include a phenolic resin, petroleum cokes, coconut dregs and so on. Examples of the activation method include the steam activation method, the molten alkali activation method and so on.

As the conductive additive, it is preferable to use a carbon black such as acetylene black, ketjen black or farness black, carbon whisker, carbon fiber, natural graphite, artificial graphite or the like. The content of the conductive additive in the electrode is preferably from 1 to 20% by weight, and the average particle diameter thereof is preferably not more than 0.5 μm.

As the binder, a binder including an aqueous solvent, a binder comprising an organic solvent or a powdery binder free from a solvent may be used. Preferable examples thereof include polytetrafluoroethylene (PTFE), styrene-butadiene rubber (SBR), acrylic rubber, carboxymethyl cellulose (CMC), hydroxypropyl cellulose, hydroxyethyl cellulose, polyvinyl alcohol, polyvinylidene fluoride (PVDF), polyamidoimide, polyimide and so on. PVDF may be either a homopolymer or a copolymer. A cellulose-based binder may be in the form of an ammonium salt or a sodium salt. Either a single binder or a mixture of two or more thereof may be used. It is preferable that the binder is contained in an amount of from 1 to 20% by weight in the polarizable electrode.

In this Embodiment, the negative electrode contains a titanium oxide. As the titanium oxide, it is preferable to use lithium titanate ($Li_4Ti_5O_{12}$, $Li_2TiO_3$), titanium dioxide ($TiO_2$) etc. The specific surface area thereof is preferably from 10 $m^2/g$ to 400 $m^2/g$, while the particle size of primary particles is preferably from 10 to 1000 nm. This is because a titanium oxide having a smaller particle size and a larger specific surface area can be homogeneously mixed to the carbon material and thus the effect of the addition of the titanium oxide can be more strongly exerted. It is preferable to add from 2 to 50% by weight of the titanium oxide based on the carbon material in the polarizable electrode of the negative electrode. In the case of using titanium dioxide, it is preferable to use titanium dioxide crystals of the anatase form, but may use a mixture of anatase and rutile crystals.

The positive electrode can be manufactured by, for example, a method including dispersing an active carbon powder and acetylene black employed as a conductive additive in a PVDF solution in N-methylpyrrolidone (NMP), and coating this mixture on an aluminum current collector by, for example, the doctor blade method followed by drying and pressing, thus obtaining a positive electrode. Alternatively, the positive electrode may be manufactured by a method including preparing a mixture of a carbon material with a conductive additive, adding polytetrafluoroethylene as a binder thereto, kneading the resultant mixture, shaping it into a sheet to obtain a polarizable electrode of the positive electrode, and then bonding it to an aluminum current collector with the use of a conductive adhesive.

The negative electrode can be manufactured by using a similar method, for example, a method including dispersing acetylene black employed as a conductive additive in a solution of PVDF in NMP, further dispersing an active carbon powder and a titanium oxide powder therein to obtain a slurry, and coating this mixture on an aluminum current collector by, for example, the doctor blade method followed by drying and pressing to obtain a negative electrode. Alternatively, the negative electrode may be manufactured by a method including preparing a mixture of a carbon material, a titanium oxide and a conductive additive, adding polytetrafluoroethylene as a binder thereto, kneading the resultant mixture, shaping it into a sheet to obtain a polarizable electrode of the negative electrode, and then bonding it to an aluminum current collector with the use of a conductive adhesive.

As the electrolytic solution, a solution of a quaternary ammonium salt in an organic solvent or an ionic liquid may be used. As a substitute for the quaternary ammonium salt, it is possible to use a quaternary onium salt. The quaternary ammonium salt in this embodiment contains a salt containing quaternary ammonium ion and a counter anion. Particularly preferable examples of the quaternary ammonium ion usable herein include a tetraethylammonium ion, a triethylmethylammonium ion, a diethylmethyl-2-methoxyethylammonium ion, a spirobipyrrolidinium ion and so on. As the quaternary onium salt, for example, a phosphonium salt, a sulfonium salt or a tetraethylphosphonium salt may be used. As the counter anion, it is preferable to use one or more members selected from among a tetrafluoroborate ion ($BF_4^-$), a hexafluorophosphate ion ($PF_6^-$), a perchlorate ion ($ClO_4^-$), a bistrifluoromethanesulfonimide ion ($TFSI^-$), a bispentafluoroethanesulfonimide ion ($BETI^-$) and a trifluoromethanesulfonate ion.

As the solvent of the electrolytic solution in this embodiment, propylene carbonate (hereinafter abbreviated as PC), ethylene carbonate, butylene carbonate, dimethyl carbonate, ethyl methyl carbonate, diethyl carbonate, sulfolane, dimethoxyethane and so on may be used. Either one of these solvents or a solvent mixture comprising two or more thereof may be used. It is also possible to employ an ionic liquid as the solvent.

As the separator, it is appropriate to use a paper separator, a polyolefin separator such as polyethylene or polypropylene, a separator containing a mixture of a polyolefin with an inorganic filler such as silica, aluminum oxide or barium titanate, a fluororesin separator, a polyimide resin separator and so on. A separator appropriately usable herein is one having a thickness of from 8 μm to 100 μm and a porosity of from 30% to 95%.

Next, the electric double-layer capacitor according to the embodiment will be illustrated in detail by referring to following Examples and Comparative Examples.

Example 1

100% by weight of active carbon having an average particle size of 15 μm and a specific surface area of 2000 $m^2/g$, 8% by weight of acetylene black employed as a conductive additive and 12% by weight of PVDF employed as a binder were added to NMP and thoroughly mixed in a planetary mixer. The paste thus obtained was coated on a 50 μm aluminum current collector with a Baker applicator and dried at 120° C. After evaporating off the solvent, it was pressed to thereby form a polarizable electrode having a thickness of about 100 μm for the positive electrode. This positive electrode was provided with a current collector tab and cut to obtain a polarizable electrode area of the positive electrode of 30 mm square.

100% by weight of active carbon having an average particle size of 15 μm and a specific surface area of 2000 $m^2/g$, 25% by weight of lithium titanate having an average particle size of 0.1 μm and a specific surface area of 10 $m^2/g$, 8% by weight of acetylene black employed as a conductive additive and 12% by weight of PVDF employed as a binder were added to NMP and thoroughly mixed in a planetary mixer. The paste thus obtained was coated on a 50 μm aluminum current collector with a Baker applicator and dried at 120° C. After evaporating off the solvent, it was pressed to thereby form a polarizable electrode having a thickness of about 110 μm for the negative electrode. This negative electrode was provided with a current collector tab and cut to obtain a polarizable electrode area of the negative electrode of 30 mm square.

These negative and positive electrodes were dried at 150° C. in vacuo for 24 hours and then employed as electrodes. The tabs of the positive and negative electrode assemblies were taken out from the packaging as leads. Before this procedure, the ports of the positive electrode tab and the negative electrode tab were preliminarily sealed by the heat fusion method with the use of a modified polypropylene film as a sealant to prevent the leakage of the electrolytic solution to outside and prevent the invasion of water and air from outside. As separator, 35 μm paper separator was employed. The positive electrode, the negative electrode and the separator were packed in a package material made of an aluminum laminate film and the sides excluding one were welded by heating to thereby form a capacitor element.

Next, an electrolytic solution was supplied. As the electrolytic solution, a solution prepared by dissolving tetraethylammonium tetrafluoroborate ($TEABF_4$) employed as an electrolyte in PC to have a concentration of 1 mol/l was used. About 2 ml of the electrolytic solution was poured into the package film in the form of a bag. Next, the capacitor element filled with the electrolytic solution was put into a vacuum container followed by evacuation to $4\times10^3$ Pa or less. Thus, the positive electrode, the negative electrode and the separator were impregnated with the electrolytic solution.

To remove impurities such as water contained in a small amount in the electrodes and the electrolytic solution, the capacitor was charged by applying voltage of 3.2 V between the positive electrode and the negative electrode for 30 minutes. After the termination of the charge, a load was connected between the positive electrode and the negative electrode and capacitor was completely discharged until the voltage was lowered to 1.5 V or less.

To remove the gas generated by the charge and the discharge and allow the electrolytic solution to further penetrate into the inside of the electrodes, evacuation was conducted again until the degree of vacuum attained about $4\times10^3$ Pa or less. Then the open side of the packaging was welded. Thus, an electric double-layer capacitor was obtained.

Example 2

An electric double-layer capacitor of Example 2 was manufactured as in Example 1 but using, as a polarizable electrode of the negative electrode, a composition including 100% by weight of active carbon having an average particle size of 15 µm and a specific surface area of 2000 $m^2/g$, 50% by weight of lithium titanate having an average particle size of 0.8 µm and a specific surface area of 10 $m^2/g$, 8% by weight of acetylene black employed as a conductive additive and 12% by weight of PVDF employed as a binder.

Example 3

An electric double-layer capacitor of Example 3 was manufactured as in Example 1 but using, as a polarizable electrode of the negative electrode, a composition including 100% by weight of active carbon having an average particle size of 15 µm and a specific surface area of 2000 $m^2/g$, 10% by weight of lithium titanate having an average particle size of 0.8 µm and a specific surface area of 10 $m^2/g$, 8% by weight of acetylene black employed as a conductive additive and 12% by weight of PVDF employed as a binder.

Example 4

An electric double-layer capacitor of Example 4 was manufactured as in Example 1 but using, as a polarizable electrode of the negative electrode, a composition including 100% by weight of active carbon having an average particle size of 15 µm and a specific surface area of 2000 $m^2/g$, 50% by weight of titanium dioxide (a mixture of anatase and rutile crystals) having an average particle size of 0.02 µm and a specific surface area of 50 $m^2/g$, 8% by weight of acetylene black employed as a conductive additive and 8% by weight of PVDF employed as a binder.

Example 5

An electric double-layer capacitor of Example 5 was manufactured as in Example 4 but using, as a polarizable electrode of the negative electrode, a composition including 100% by weight of active carbon having an average particle size of 15 µm and a specific surface area of 2000 $m^2/g$, 35% by weight of titanium dioxide having an average particle size of 0.02 µm and a specific surface area of 50 $m^2/g$, 8% by weight of acetylene black employed as a conductive additive and 12% by weight of PVDF employed as a binder.

Example 6

An electric double-layer capacitor of Example 6 was manufactured as in Example 4 but using, as a polarizable electrode of the negative electrode, a composition including 100% by weight of active carbon having an average particle size of 15 µm and a specific surface area of 2000 $m^2/g$, 25% by weight of titanium dioxide having an average particle size of 0.02 µm and a specific surface area of 50 $m^2/g$, 8% by weight of acetylene black employed as a conductive additive and 12% by weight of PVDF employed as a binder.

Example 7

An electric double-layer capacitor of Example 7 was manufactured as in Example 4 but using, as a polarizable electrode of the negative electrode, a composition including 100% by weight of active carbon having an average particle size of 15 µm and a specific surface area of 2000 $m^2/g$, 15% by weight of titanium dioxide having an average particle size of 0.02 µm and a specific surface area of 50 $m^2/g$, 8% by weight of acetylene black employed as a conductive additive and 12% by weight of PVDF employed as a binder.

Example 8

An electric double-layer capacitor of Example 8 was manufactured as in Example 4 but using, as a polarizable electrode of the negative electrode, a composition including 100% by weight of active carbon having an average particle size of 15 µm and a specific surface area of 2000 $m^2/g$, 10% by weight of titanium dioxide having an average particle size of 0.02 µm and a specific surface area of 50 $m^2/g$, 8% by weight of acetylene black employed as a conductive additive and 12% by weight of PVDF employed as a binder.

Example 9

An electric double-layer capacitor of Example 9 was manufactured as in Example 4 but using, as a polarizable electrode of the negative electrode, a composition including 100% by weight of active carbon having an average particle size of 15 µm and a specific surface area of 2000 $m^2/g$, 5% by weight of titanium dioxide having an average particle size of 0.02 µm and a specific surface area of 50 $m^2/g$, 8% by weight of acetylene black employed as a conductive additive and 12% by weight of PVDF employed as a binder.

Example 10

An electric double-layer capacitor of Example 10 was manufactured as in Example 4 but using, as a polarizable electrode of the negative electrode, a composition including 100% by weight of active carbon having an average particle size of 15 µm and a specific surface area of 2000 $m^2/g$, 2% by weight of titanium dioxide having an average particle size of 0.02 µm and a specific surface area of 50 $m^2/g$, 8% by weight of acetylene black employed as a conductive additive and 12% by weight of PVDF employed as a binder.

Example 11

An electric double-layer capacitor of Example 11 was manufactured as in Example 4 but using, as a polarizable electrode of the negative electrode, a composition including 100% by weight of active carbon having an average particle size of 15 µm and a specific surface area of 2000 $m^2/g$, 25% by weight of titanium dioxide having an average particle size of 0.02 µm and a specific surface area of 50 $m^2/g$, 8% by weight of acetylene black employed as a conductive additive and 8% by weight of PVDF employed as a binder.

Example 12

An electric double-layer capacitor of Example 12 was manufactured as in Example 1 but using, as a polarizable electrode of the negative electrode, a composition including 100% by weight of active carbon having an average particle size of 15 µm and a specific surface area of 2000 $m^2/g$, 25% by weight of lithium titanate having an average particle size of 1 µm and a specific surface area of 2 $m^2/g$, 8% by weight of acetylene black employed as a conductive additive and 12% by weight of PVDF employed as a binder.

Comparative Example 1

An electric double-layer capacitor of Comparative Example 1 was manufactured as in Example 1 but manufacturing a polarizable electrode of the negative electrode by using the same materials as in the polarizable electrode of the positive electrode, i.e., without containing lithium titanate.

Comparative Example 2

An electric double-layer capacitor of Comparative Example 2 was manufactured as in Example 1 but using, as a polarizable electrode of the negative electrode, a composition comprising 100% by weight of lithium titanate having an average particle size of 0.8 μm and a specific surface area of 10 m²/g, 8% by weight of acetylene black employed as a conductive additive and 12% by weight of PVDF employed as a binder, and an electrolytic solution prepared by dissolving $LiBF_4$ employed as an electrolyte in PC to have a concentration of 1 mol/l.

Comparative Example 3

An electric double-layer capacitor of Comparative Example 3 was manufactured as in Example 1 but using an electrolytic solution prepared by dissolving $LiBF_4$ employed as an electrolyte in PC to have a concentration of 1 mol/l.

Comparative Example 4

An electric double-layer capacitor of Comparative Example 4 was manufactured as in Example 4 but using an electrolytic solution prepared by dissolving $LiBF_4$ employed as an electrolyte in PC to have a concentration of 1 mol/l.

Comparative Example 5

An electric double-layer capacitor of Comparative Example 5 was manufactured as in Example 1 but alternating the positive and negative electrodes in Example 1 with each other.

Comparative Example 6

An electric double-layer capacitor of Comparative Example 6 was manufactured as in Example 4 but alternating the positive and negative electrodes in Example 4 with each other.

Comparative Example 7

An electric double-layer capacitor of Comparative Example 7 was manufactured as in Example 4 but using, as a polarizable electrode of the negative electrode, a composition including 100% by weight of active carbon having an average particle size of 15 μm and a specific surface area of 2000 m²/g, 1.0% by weight of titanium dioxide having an average particle size of 0.02 μm and a specific surface area of 50 m²/g, 8% by weight of acetylene black employed as a conductive additive and 12% by weight of PVDF employed as a binder.

Comparative Example 8

An electric double-layer capacitor of Comparative Example 8 was manufactured as in Example 4 but using, as a polarizable electrode of the negative electrode, a composition including 100% by weight of active carbon having an average particle size of 15 μm and a specific surface area of 2000 m²/g, 0.5% by weight of titanium dioxide having an average particle size of 0.02 μm and a specific surface area of 50 m²/g, 8% by weight of acetylene black employed as a conductive additive and 12% by weight of PVDF employed as a binder.

Comparative Example 9

An electric double-layer capacitor of Comparative Example 9 was manufactured as in Example 4 but using, as a polarizable electrode of the negative electrode, a composition including 100% by weight of active carbon having an average particle size of 15 μm and a specific surface area of 2000 m²/g, 60% by weight of titanium dioxide having an average particle size of 0.02 μm and a specific surface area of 50 m²/g, 8% by weight of acetylene black employed as a conductive additive and 12% by weight of PVDF employed as a binder.

Comparative Example 10

An electric double-layer capacitor of Comparative Example 10 was manufactured as in Example 4 but using, as a polarizable electrode of the negative electrode, a composition including 100% by weight of active carbon having an average particle size of 15 μm and a specific surface area of 2000 m²/g, 100% by weight of titanium dioxide having an average particle size of 0.02 μm and a specific surface area of 50 m²/g, 8% by weight of acetylene black employed as a conductive additive and 12% by weight of PVDF employed as a binder.

Initial electrostatic capacities and internal resistances were measured by using the electric double-layer capacitors of Examples 1 to 12 and Comparative Examples 1 to 10.

In the case of referring the electrostatic capacitance as to C [F], the integrated discharge power as to P [W·sec], the discharge initiation voltage as to $V_1$ [V] and the discharge termination voltage as to $V_2$ [V], the integrated discharge power P is represented as follows.

$$P = \tfrac{1}{2} C \cdot V_1^2 - \tfrac{1}{2} C \cdot V_2^2 \qquad \text{Formula (2)}$$

In this case, the electrostatic capacitance C is represented as follows, and thus the electrostatic capacitance C can be calculated.

$$C = 2P/(V_1^2 - V_2^2) \qquad \text{Formula (3)}$$

By using a charge/discharge apparatus (Model ACD-10 APS-05N, manufactured by ASKA Electronic Co., Ltd.), the integrated discharge power P, the discharge initiation voltage $V_1$ and the discharge termination voltage as to $V_2$ were measured and the electrostatic capacitance C was calculated. Further, the electrostatic capacitance C was divided by the sum of weight of the positive electrode active materials and the weight of the negative electrode active materials to be commuted to standardized electrostatic capacitance C per unit weight [F/g]. The charge/discharge conditions employed in measuring of the electrostatic capacitance are as follows. After each capacitor was constant-current charged to 2.7 V at current of 3.3 mA/cm², charge was conducted at the constant voltage, i.e., the constant current/constant voltage charge method. Then, the capacitor was constant-current discharged to 0 V at current of 3.3 mA/cm².

The internal resistance R [Ω] is represented by the following formula wherein δE [V] represents a decrease in voltage and I[A] represents a discharge current.

$$R = \delta E / I \qquad \text{Formula (4)}$$

The decrease in voltage $\delta E$ can be represented as the difference between the voltage before discharge initiation $V_3$ [V] and the discharge initiation voltage $V_1$ [V], as follows.

$$\delta E=(V_3-V_1) \quad \text{Formula (5)}$$

Based on the formulae (4) and (5), R can be represented as follows.

$$R=(V_3-V_1)/I \quad \text{Formula (6)}$$

By measuring the voltage before discharge initiation $V_3$, the discharge initiation voltage $V_1$ and the discharge current I with the charge/discharge apparatus, the internal resistance R was calculated.

Next, a charge/discharge cycle test was conducted at a charge/discharge current of 10 mA/cm$^2$ within a range of 2.7 V to 1.5 V. After 50,000 cycles, the electrostatic capacitance C was measured and the retention rate (cycle test characteristics) was calculated by referring to the initial electrostatic capacitance as to 100%. By using another samples of the individual electric double-layer capacitors of Examples 1 to 12 and Comparative Examples 1 to 10, each sample was maintained in an environment at 70° C. in a charged state of 3.0 V. After 500 hours, the temperature was lowered to room temperature and the electrostatic capacitance and the internal resistance were measured (float test characteristics). FIG. 1 shows these measurement data.

In an electric double-layer capacitor, higher electrostatic capacitance retention rate after 500 hours in the cycle test characteristics means the better charge/discharge characteristics and thus higher voltage can be established thereby. Larger electrostatic capacitance in the float test characteristics means the better high temperature-maintaining properties and thus the life period is possibly prolonged. An electric double-layer capacitor showing electrostatic capacitance retention rate in the cycle test characteristics of 85% or higher and electrostatic capacitance retention rate after 500 hours in the float test characteristics of 15 F/g or higher is evaluated as being usable in practice. An electric double-layer capacitor showing electrostatic capacitance retention rate in the cycle test characteristics of 90% or higher and electrostatic capacitance retention rate after 500 hours in the float test characteristics of 18 F/g or higher is evaluated as having satisfactory voltage characteristics and life characteristics for any purposes of electric double-layer capacitors.

FIG. 1 shows that the electric double-layer capacitors of Examples 1 to 11, each having a negative electrode containing active carbon together with a titanium oxide such as lithium titanate or titanium dioxide and an electrolytic solution having an ammonium salt dissolved therein, were superior in the charge/discharge cycle test characteristics and the float test characteristics to the electric double-layer capacitor of Comparative Example 1 in which no titanium oxide was added.

Also, the electric double-layer capacitors of Examples 1 to 12 were superior in the charge/discharge cycle test characteristics and the float test characteristics to the electric double-layer capacitor of Comparative Example 2 having an electrolytic solution containing a lithium salt dissolved therein and a negative electrode consisting exclusively of lithium titanate and those of Comparative Examples 3 and 4 having an electrolytic solution containing a lithium salt dissolved therein and a negative electrode containing a titanium oxide.

Also, the electric double-layer capacitors of Examples 1 to 12 were superior in the charge/discharge cycle test characteristics and the float test characteristics to the electric double-layer capacitors of Comparative Examples 5 and 6 having an electrolytic solution containing an ammonium salt dissolved therein and a positive electrode containing a titanium oxide. In Example 11, an electrolytic solution containing an ammonium salt dissolved therein was used and a titanium oxide was added to the positive electrode. In this case, however, the addition of a titanium oxide to the negative electrode exerted a remarkable effect, which made the electric double-layer capacitor of Example 11 superior in the charge/discharge cycle test characteristics and the float test characteristics to that of Comparative Examples 6 in which a titanium oxide was added to the positive electrode alone.

The electric double-layer capacitors of Examples 1 to 12 wherein 2 to 50% by weight of a titanium oxide with respect to 100% by weight of active carbon was added to the negative electrode were superior in the charge/discharge cycle test characteristics and the float test characteristics to the electric double-layer capacitor of Comparative Example 7 wherein 1.0% by weight of a titanium oxide with respect to 100% by weight of active carbon was added to the negative electrode. The former electric double-layer capacitors were also superior in the charge/discharge cycle test characteristics and the float test characteristics to the electric double-layer capacitor of Comparative Example 9 wherein 60% by weight of a titanium oxide with respect to 100% by weight of active carbon was added to the negative electrode. Thus, it is preferable that the amount of the titanium oxide to be added to the active carbon is 2% by weight or more but not more than 50% by weight.

Further, the electric double-layer capacitors of Examples 1 to 11 wherein a titanium oxide having a specific surface area of 10 m$^2$ or more was added to the negative electrode were superior in the charge/discharge cycle test characteristics and the float test characteristics to the electric double-layer capacitor of Example 12 wherein a titanium oxide having a specific surface area of 2 m$^2$ was added to the negative electrode. In the case where the specific surface area of a titanium oxide is 10 m$^2$/g or more, therefore, an improved effect of preventing deterioration during storage at high voltage or high temperature can be established.

A comparison of Example 1 with Comparative Example 3, wherein different electrolytic salts (i.e., an ammonium salt and a lithium salt) were employed, indicates that a lithium salt resulted in worse cycle test characteristics and a higher degradation rate during storage at high voltage than the ammonium salt.

FIG. 2 shows a comparison of the initial electrostatic capacities and those after 500 hours observed by using the electric double-layer capacitors of Examples 4 to 10 and Comparative Examples 7 to 10, using a titanium oxide having a specific surface area of 50 m$^2$/g and varying the weight rate of the titanium oxide to active carbon in the negative electrode.

As shown in FIG. 2, in the electrostatic capacitance per unit polarizable electrode weight, the electrostatic capacitance (F/g) decreased with an increase in the weight ratio of a titanium oxide that has no electrostatic capacitance. Concerning the electrostatic capacities after 500 hours, however, the electrostatic capacities with the addition of 2% by weight or more but not more than 50% by weight of a titanium oxide clearly exceeded the electrostatic capacitance with the addition of no titanium oxide (0% by weight). That is to say, the life characteristics of an electric double-layer capacitor can be improved by adding 2% by weight or more but not more than 50% by weight of a titanium oxide. When the weight ratio of a titanium oxide to active carbon is within the range of 2 to 50% by weight, therefore, the electrostatic capacitance after 500 hours in the float test characteristics amounts to 15 F/g or more. When the weight ratio thereof is from 5 to 35% by weight, the electrostatic capacitance after 500 hours in the float test characteristics amounts to 18 F/g or more.

Figure 3:
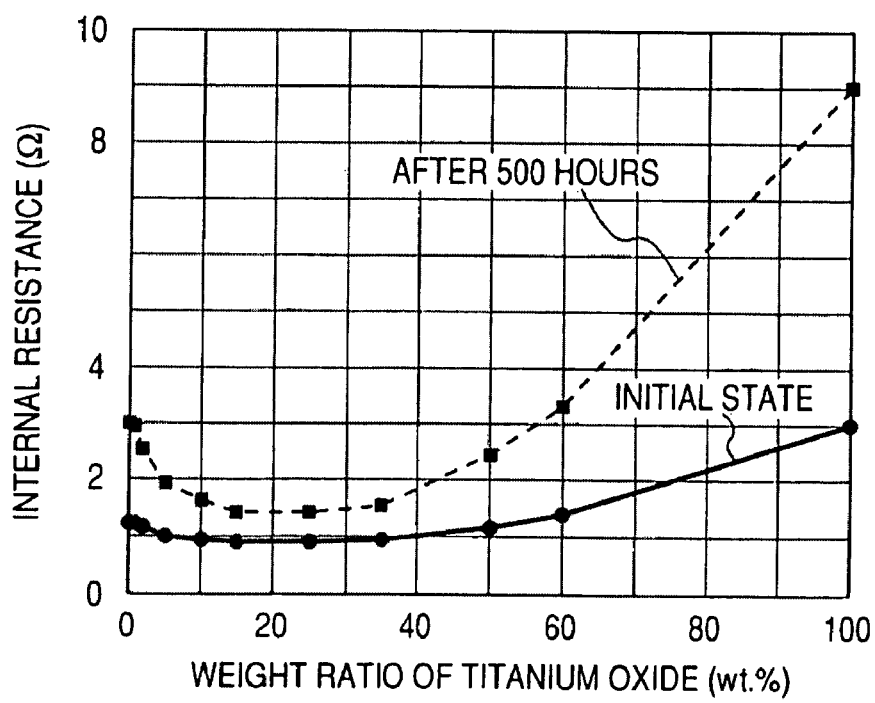
FIG. 3 shows the characteristics of Examples and Comparative Examples.

FIG. 3 shows a comparison of the initial internal resistances and those after 500 hours observed by using the electric double-layer capacitors of Examples 4 to 10 and Comparative Examples 7 to 10, using a titanium oxide having a specific surface area of 50 $m^2/g$ and varying the weight rate of the titanium oxide to active carbon in the negative electrode.

As shown in FIG. 3, the internal resistance was lowered with an increase in the weight rate of the titanium oxide, although the titanium oxide is a semiconductor. In the case of using 60% by weight of the titanium oxide, however, the internal resistance showed an obvious increase. In the weight ratio range of 2% by weight or more but not more than 50% by weight, therefore, the internal resistances were obviously lower than the internal resistance of the case adding no titanium oxide (0%). Although the internal resistance would increase with the progress of deterioration too, the addition of titanium oxide contributes to the improvement in the life performance, as shown in FIG. 2. Owing to this effect, the internal resistances after 500 hours in the cases within the weight ratio range of 2% by weight or more but not more than 50% by weight were obviously lower than the internal resistance of the case adding no titanium oxide (0%).

Figure 4:
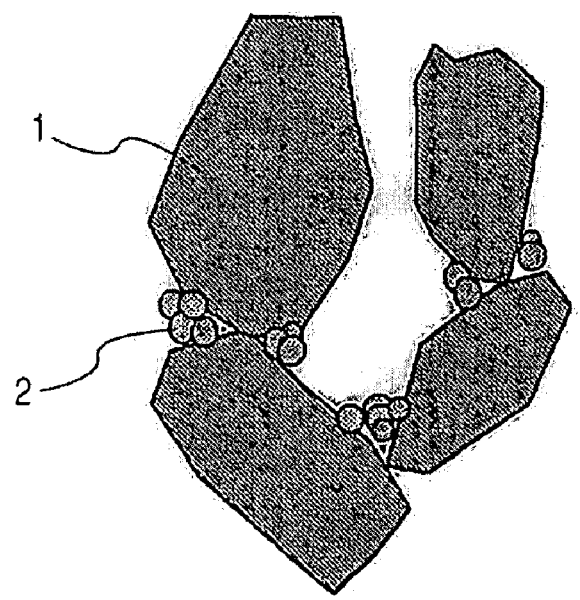
FIG. 4 is an enlarged model view showing the inside of a polarizable electrode for illustrating a change in the internal resistance.
Figure 5:
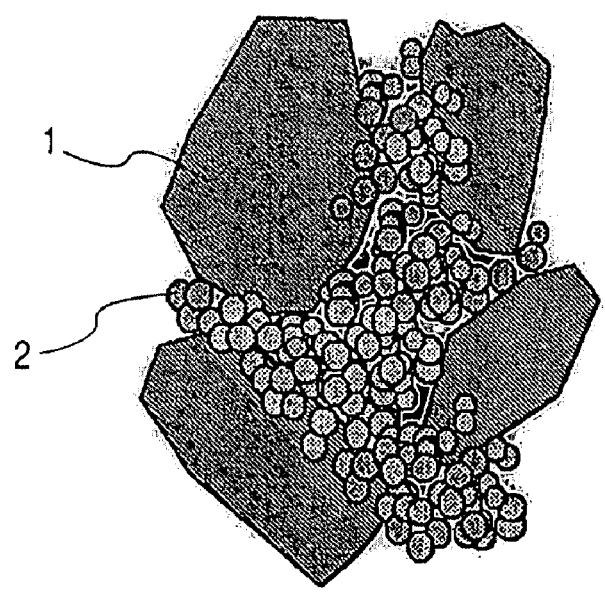
FIG. 5 is an enlarged model view showing the inside of a polarizable electrode for illustrating a change in the internal resistance.

Now, the reason for the lowering in internal resistance in the cases within the weight ratio range of 2% by weight or more but not more than 50% by weight will be described with reference to FIGS. 4 and 5. FIGS. 4 and 5 are enlarged model views respectively showing the inside of a polarizable electrode containing 2% by weight of a titanium oxide and the inside of a polarizable electrode containing 50% by weight of a titanium oxide.

In the case of adding 2% by weight of a titanium oxide, as shown in FIG. 4, there are semiconducting titanium oxide particles 2 around an area where active carbon particles 1 come into direct contact with each other. It is considered that even in an area where active carbon particles 1 are not in direct contact with each other, electrons migrate via these titanium oxide particles 2 and thus the electrical conductivity is collaterally improved. When the amount of the titanium oxide attains 50% by weight, on the other hand, it is considered that the titanium oxide particles 2 enter the spaces among the active carbon particles 1, as shown in FIG. 5. As a result, the direct contact of the titanium oxide particles 2 with each other is interfered and thus the internal resistance is elevated.

As discussed above, by using a negative electrode, wherein 2% by weight or more but not more than 50% by weight of a titanium oxide such as lithium titanate or titanium dioxide was added to a carbon material such as active carbon, and an electrolytic solution containing an ammonium salt dissolved therein, the electrostatic capacitance after 500 hours in the float test characteristics became 15 F/g or more. Thus, an electric double-layer capacitor having excellent charge/discharge cycle characteristics and suffering from little decrease in the deterioration rate of electrostatic capacitance during storage at high voltage could be manufactured. In the case where the titanium oxide added has a specific surface area of 10 $m^2/g$ or more, the effect of preventing a decrease in the deterioration of electrostatic capacitance during storage at high voltage or high temperature can be improved.

So long as the weight ratio of the titanium oxide to the carbon material such as active carbon falls within the range of from 5 to 35% by weight, the electrostatic capacitance after 500 hours in the float test characteristics becomes 18 F/g or more. As a result, the effect of preventing a decrease in the deterioration rate of electrostatic capacitance during storage at high voltage or high temperature becomes further remarkable.

Although PVDF was employed as a binder in the above Examples, similar results were obtained by using a mixture of SBR with CMC, a mixture of an acrylic rubber with CMC, or PTFE as a binder.

Although titanium dioxide was employed as a titanium oxide in the above Examples, reduced titanium oxide having been subjected to a reduction treatment such as hydrogen reduction may be used. In this case, the electron transfer resistance of the titanium oxide is lowered and thus the effect of lowering the internal resistance becomes more remarkable. In this case, furthermore, there arises an effect of trapping oxygen so as to achieve an effect of relieving deterioration by incorporating oxygen that undesirably affects deterioration.

What is claimed is:

1. An electric double-layer capacitor comprising:
a positive electrode containing a carbon material;
a negative electrode containing a carbon material, a conductive additive, and a fine particle titanium dioxide; the conductive additive being a material other than the fine particle titanium dioxide, the fine particle titanium dioxide including titanium dioxide crystals of an anatase form; and
an electrolytic solution containing an ammonium salt as an electrolyte salt and does not include Lithium ions,
wherein a weight ratio of the conductive additive to the carbon material contained in the negative electrode is 1% by weight or more but not more than 20% by weight, with an average particle diameter of less than 0.5 μm,
a weight ratio of the fine particle titanium dioxide to the carbon material contained in the negative electrode is 2% by weight or more but not more than 50% by weight, with a specific surface area of 10 $m^2/g$ or more, and
said electric double-layer capacitor is driven at 3.0 V or more, and
wherein the positive electrode and the negative electrode are impregnated with the electrolytic solution,
the electric double-layer capacitor is charged by applying a voltage of 3.2 V between the positive electrode and the negative electrode for 30 minutes so as to remove impurity, and
the positive electrode and the negative electrode are packed in a packaging after applying the voltage.

2. The electric double-layer capacitor according to claim 1, wherein the weight ratio of the titanium dioxide to the carbon material contained in the negative electrode is 5% by weight or more but not more than 35% by weight.

3. The electric double-layer capacitor according to claim 1, wherein the titanium dioxide is subjected to a reduction treatment.

4. The electric double-layer capacitor according to claim 1, wherein an average particle size of the carbon material is greater than or equal to 0.5 μm and less than or equal to 20 μm.

5. The electric double-layer capacitor according to claim 1, wherein the electrolytic solution containing ammonium salt as an electrolyte salt is a solution prepared by dissolving tetra-ethylammonium tetrofluoroborate (TEABF$_4$) into organic solvent.

6. The electric double-layer capacitor according to claim 1, wherein the titanium dioxide is reduced titanium dioxide.

7. The electric double-layer capacitor according to claim 1, wherein
a specific surface area of the fine particle titanium dioxide ranges from 10 $m^2/g$ to 400 $m^2/g$, and a particle size of primary particles of the fine particle titanium dioxide ranges from 10 to 1000 nm.

8. The electric double-layer capacitor according to claim 1, wherein the weight ratio of the conductive additive to the carbon material contained in the negative electrode is approximately 8% by weight, and the weight ratio of the fine particle titanium dioxide to the carbon material contained in the negative electrode is approximately 25% by weight.

* * * * *